United States Patent
Spencer (10) Patent No.: US 7,616,697 B2
(45) Date of Patent: Nov. 10, 2009

(54) COOPERATIVE INTER-CARRIER CHANNEL CODING APPARATUS, SYSTEMS, AND METHODS

(75) Inventor: Paul Spencer, Modiin (IL)

(73) Assignee: Intel Corporation, Santa Clara, CA (US)

( * ) Notice: Subject to any disclaimer, the term of this patent is extended or adjusted under 35 U.S.C. 154(b) by 531 days.

(21) Appl. No.: 11/400,757

(22) Filed: Apr. 7, 2006

(65) Prior Publication Data

US 2007/0237251 A1 Oct. 11, 2007

(51) Int. Cl.
*H04L 5/12* (2006.01)
(52) U.S. Cl. .................. 375/265; 375/295
(58) Field of Classification Search ............... 375/265, 375/267, 341, 347, 349; 370/207–210
See application file for complete search history.

(56) References Cited

U.S. PATENT DOCUMENTS

| 5,966,644 A * | 10/1999 | Suzuki ...................... 455/76 |
| 2003/0053435 A1 | 3/2003 | Sindhushayana et al. |
| 2003/0066018 A1* | 4/2003 | Yu et al. ..................... 714/792 |
| 2003/0123381 A1* | 7/2003 | Zhuang et al. ............. 370/208 |
| 2004/0082356 A1* | 4/2004 | Walton et al. .............. 455/522 |
| 2004/0109495 A1 | 6/2004 | Yoon et al. |
| 2004/0120349 A1* | 6/2004 | Border et al. .............. 370/474 |
| 2005/0111376 A1 | 5/2005 | Raghothaman et al. |
| 2006/0203836 A1* | 9/2006 | Kim .......................... 370/431 |
| 2006/0250944 A1* | 11/2006 | Hong et al. ................ 370/210 |
| 2007/0002823 A1* | 1/2007 | Skov Andersen et al. ... 370/349 |

FOREIGN PATENT DOCUMENTS

WO WO-03056716 A2 7/2003

OTHER PUBLICATIONS

"802.11g™ IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications; Amendment 4:Further Higher Data Rate Extension in the 2.4 GHz Band", *IEEE Std. 802.11g™-2003*, The Institute of Electrical and Electronics Engineers, Inc., New York, NY, (Jun. 27, 2003), 78 pgs.

(Continued)

*Primary Examiner*—Emmanuel Bayard
(74) *Attorney, Agent, or Firm*—Schwegman, Lundberg & Woessner, P.A.; Gregory J. Gorrie (57) ABSTRACT

Embodiments of a codation module associated with a global system for mobile communications (GSM) enhanced data rates for GSM evolution (EDGE) radio access network (GE-RAN) transceiver are described generally herein. The codation module may include a turbo encoder to produce a first turbo-encoded data block, and a channel interleaver may split the first turbo-encoded data block into a first plurality of turbo-encoded data bursts and to interleave the first plurality of turbo-encoded data bursts for individual transmission on a plurality of tonal carriers. The tonal carriers may correspond to independent GERAN frequency channels.

30 Claims, 4 Drawing Sheets

OTHER PUBLICATIONS

"Dual-Carrier EGPRS for GERAN Evolution", *3GPP TSG GERAN#25*, Nokia,(2005), 9 pgs.

"IEEE Standard 802.11e™—IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications; Amendment 8: Medium Access Control (MAC) Quality of Service Enhancements", *IEEE Std 802.11e™—2005*, The Institute of Electrical and Electronics Engineers, Inc., New York, NY, (Nov. 11, 2005), 211 pgs.

"IEEE Standard for Information Technology—Telecommunications and Information Exchange Between Systems—Local and Metropolitan Area Networks Specific Requirements, Part 11: Wireless LAN Medium Access Control (MAC) and Physical Layer (PHY) Specifications; Amendment 2: Higher Speed Physical Layer (PHY) Extension in the 2.4 GHz Band—Corrigendum 1", *IEEE Std. 802.11b-1999/Cor. 1-2001 (R2003)*, The Institute of Electrical and Electronics Engineers, Inc., New York, NY, (1999), 24 pgs.

"Information Technology—Telecommunications and Information Exchange Between Systems—Local and Metropolitan Area Networks—Specific Requirements, Part 11: Wireless LAN Medium Access Control (MAC) and Physical Layer (PHY) Specifications", *ANSI/IEEE Std. 802.11, 1999 Edition (R2003)*, The Institute of Electrical and Electronics Engineers, Inc., New York, NY, (2003), 528 pgs.

"Supplement to IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications: Higher-Speed Physical Layer Extension in the 2.4 GHz Band", *IEEE Std. 802.11b-1999(R2003)*, The Institute of Electrical and Electronics Engineers, Inc., New York, NY, (1999), 96 pgs.

"Supplement to IEEE Standard for Information Technology—Telecommunications and Information Exchange Between Systems—Local and Metropolitan Area Networks—Specific Requirements—Part 11:Wireless LAN Medium Access Control (MAC)and Physical Layer (PHY) Specifications: :High-Speed Physical Layer in 5GHZ Band", *IEEE Std. 802.11a-1999*, The Institute of Electrical and Electronics Engineers, Inc., New York, NY, (Dec. 30, 1999), 90 pgs.

\* cited by examiner

COOPERATIVE INTER-CARRIER CHANNEL CODING APPARATUS, SYSTEMS, AND METHODS

TECHNICAL FIELD

Various embodiments described herein relate to digital communications generally, including apparatus, systems, and methods used in wireless communications.

BACKGROUND INFORMATION

An evolving family of standards, specifications, and technical reports is being developed by the Third Generation Partnership Project (3GPP™) to define parameters associated with second and third generation wireless communication systems. These systems include a Global System for Mobile communication (GSM) and data access technologies such as General Packet Radio Service (GPRS) and Enhanced Data rates for GSM Evolution (EDGE). The acronyms GSM, GPRS, and EDGE are subsumed in "GSM EDGE radio access network (GERAN)." Additional information regarding these technologies may be found in European Telecommunications Standards Institute (ETSI) Technical Specification TS 101 855 V8.17.0, Digital Cellular Telecommunications System (Phase 2+); Technical Specifications and Technical Reports for a GERAN-based 3GPP System (3GPP TS 01.01 version 8.17.0 Release 1999) (published June 2005). Additional information regarding the 3GPP™ may be found at http://www.3gpp.org/.

Current GERAN standardizations may use modulation and coding schemes (MCSs) that include a one-third rate convolution coding operation followed by puncturing to a desired code rate. These MCSs may be denoted MCS1 thru MCS9. A resulting punctured block may be interleaved across several time-division multiple-access (TDMA) frames. For example, the block may be divided into four bursts and the bursts may then be transmitted in four consecutive TDMA frames.

A frequency hopping capability available in GSM may be configured as disabled, in which case the four bursts may be transmitted on the same up-conversion frequency. Alternatively, frequency hopping may be configured as enabled, in which case the four bursts may be transmitted on different up-conversion frequencies. for example, MCS7, MCS8 and MCS9 are encoded at a high rate and are modulated to enable them to provide data rates of approximately 45.0 to 59.4 kilobits (kbits)/s per timeslot. MCS7, MCS8, and MCS9 may operate using coding rates of R=0.75, 0.82, and 1.0, respectively. These high coding rates may result in substantially degraded performance, both in hopping channels and in non-hopping channels, at over-terrain speeds greater than a few kilometers per hour. Throughput may become capped due to block error rate (BLER) floors associated with these MCSs at higher over-terrain speeds, such that maximum theoretical throughputs may be unachievable even as signal-to-noise ratios (SNRs) increase.

DETAILED DESCRIPTION

Figure 1:
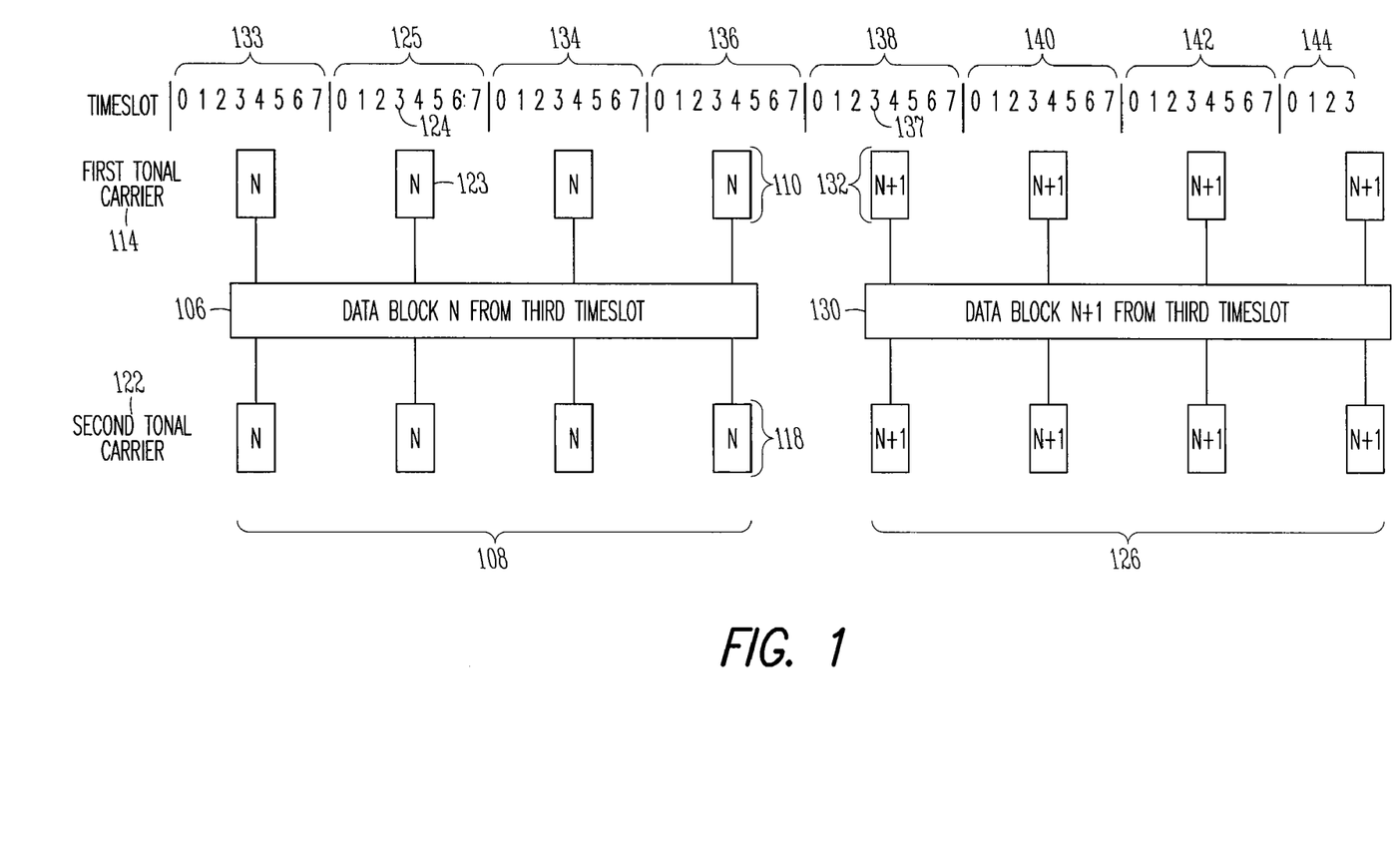
FIG. 1 is a GERAN system timeslot diagram according to various embodiments.

FIG. 1 is a GERAN system timeslot diagram according to various embodiments. Embodiments herein may enhance performance through the use of cooperative channel encoding ("interleaving") of a data block across multiple GERAN tonal carriers. Multi-carrier interleaving may increase throughput by increasing carrier diversity. Interleaving may achieve a greater throughput than simply transmitting two independent GERAN channels, one on each tonal carrier.

In an example embodiment, a turbo-encoded data block 106 may be divided into a first set of eight data bursts 108. A first subset of four data bursts 110 may be transmitted on a first tonal carrier 114. A second subset of four data bursts 118 may be transmitted on a second tonal carrier 122. A data burst 123 of the first subset of data bursts 110 may be inserted in a third timeslot 124 of a frame 125. A second set of eight data bursts 126 associated with a next turbo-encoded data block 130 may then be transmitted on the first tonal carrier 114 and on the second tonal carrier 122. Transmission of additional blocks of a data stream may continue in like manner.

Other channel-interleaved coding schemes may be possible. In some embodiments, for example, data bursts may be interleaved between more than two tonal carriers. Sequential data bursts may occupy more than one timeslot within a GERAN frame, and some frames may be skipped as data bursts associated with an encoded block are placed into sequential frames.

Embodiments herein may utilize a block length greater than a payload block length specified in an enhanced GPRS (EGPRS) specification. Error rates may be decreased, because error rates associated with turbo-encoded blocks may decrease with block length. For example, some embodiments may double the EGPRS block length, for example. Such performance increase may not be possible with GERAN convolution coding, because performance associated with convolution-encoded blocks may decrease with increasing block length. Additional information regarding EGPRS block lengths may be found in 3GPP TS 43.064 V6.5.0 (2004-11) Technical Specification, 3rd Generation Partnership Project; Technical Specification Group GSM/EDGE Radio Access Network; General Packet Radio Service (GPRS); Overall description of the GPRS Radio Interface; Stage 2 (Release 6) (published November 2004).

Figure 2:
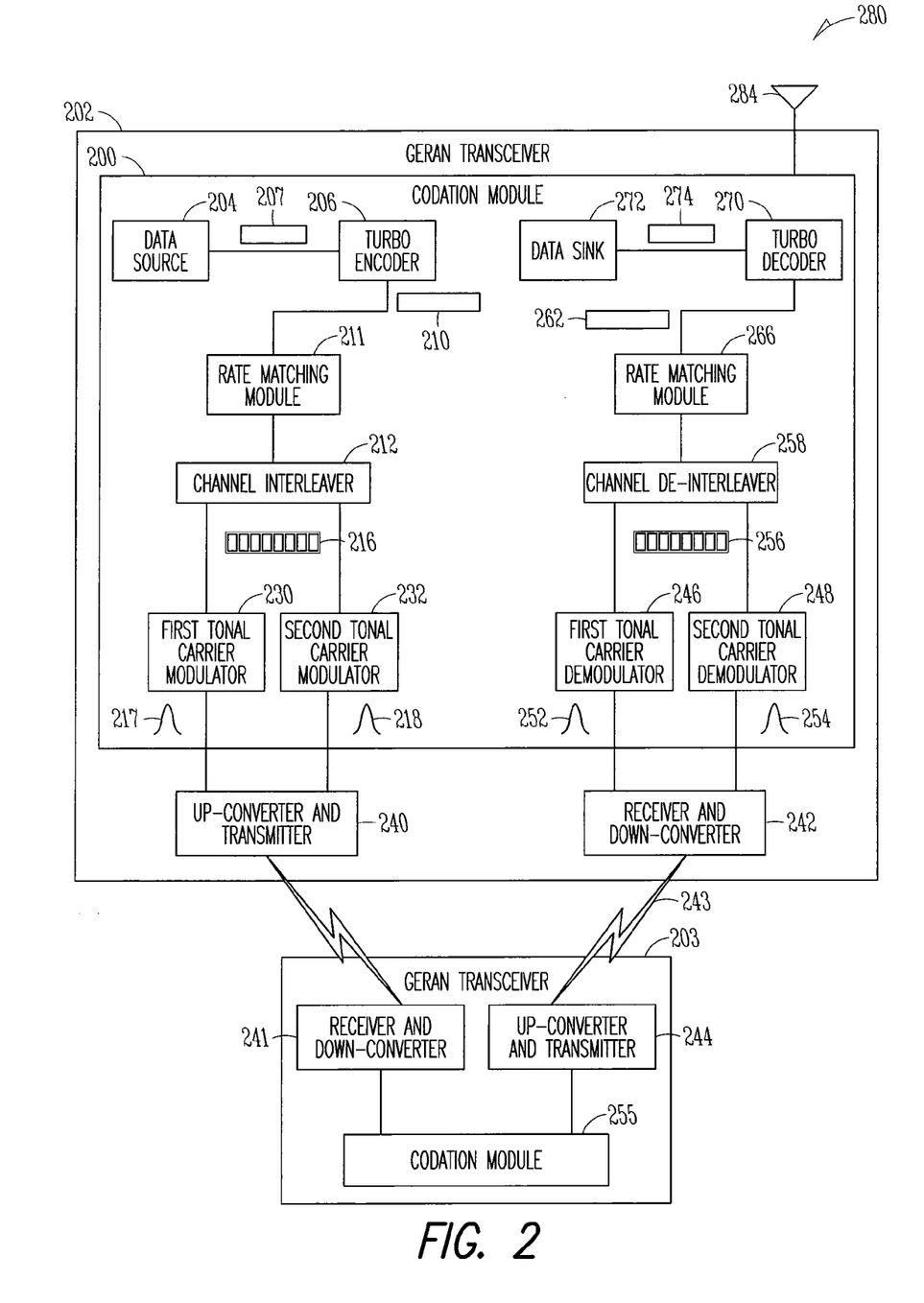
FIG. 2 is a block diagram of a codation module and a representative system according to various embodiments.

FIG. 2 is a block diagram of a codation module 200 and a representative system 280 according to various embodiments. The codation module 200 may be associated with a first GERAN transceiver 202. The first GERAN transceiver 202 may communicate with one or more additional GERAN transceivers (e.g., with a second GERAN transceiver 203).

The codation module 200 may include a data source 204 and a turbo encoder 206 coupled to the data source 204. The data source 204 may supply a data block 207 to the turbo encoder 206. The turbo encoder 206 may produce a first turbo-encoded data block 210 from the data block 207. A block length associated with the first turbo-encoded data block 210 may, but need not, comprise a multiple of an EGPRS block length, as previously described. For example, the multiple may be greater than or equal to 1.0.

A first rate-matching module 211 may be coupled to the turbo encoder 206. The first rate-matching module 211 may perform a bit puncturing operation on the first turbo-encoded data block 210 to increase the coding rate, a bit repetition operation to increase a signal-to-noise ratio associated with a repeated bit, or both.

The codation module 200 may also include a channel interleaver 212. The channel interleaver 212 may be operatively coupled to the turbo encoder 206. The channel interleaver 212 may split the first turbo-encoded data block 210 into a first plurality of turbo-encoded data bursts 216. The channel interleaver 212 may interleave the first plurality of turbo-encoded data bursts 216 for transmission across a plurality of tonal carriers (e.g., a first tonal carrier 217 and a second tonal carrier 218).

In some embodiments, the channel interleaver 212 may be adapted to interleave the first plurality of turbo-encoded data bursts 216 across one or more timeslots in each one of a subsequent sequence of frames. A separate sequence of frames may be associated with each of the plurality of tonal carriers.

Referring back to FIG. 1, for example, the first set of eight data bursts 108 may be interleaved between the first tonal carrier 114 and the second tonal carrier 122. Each of the first subset of four data bursts 110 may be inserted into a third timeslot (e.g., the third timeslot 124) associated with each subsequent one of frames 133, 125, 134, and 136. A next subset of four data bursts 132 associated with the next data block 130 may be inserted into a subsequent third timeslot (e.g., the timeslot 137) of each of the next four frames 138, 140, 142, and 144 associated with the first tonal carrier 114. In some embodiments, each subsequent frame may be populated with at least one data burst (e.g., with no frames unpopulated).

Turning again to FIG. 2, a plurality of tonal carrier modulators (e.g., a first tonal carrier modulator 230 and a second tonal carrier modulator 232) may be coupled to the channel interleaver 212. The plurality of tonal carrier modulators may modulate a plurality of tonal carriers (e.g., the first tonal carrier 217 and the second tonal carrier 218) with the first plurality of turbo-encoded data bursts 216. The modulated plurality of tonal carriers may then be up-converted and transmitted by an up-converter and transmitter 240 to a receiver and down-converter 241 associated with the second GERAN transceiver 203.

The codation module 200 may also include a receiver and down-converter 242. The receiver and down-converter 242 may receive and down-convert a radio-frequency (RF) signal 243 received from an up-converter and transmitter 244 associated with the second GERAN transceiver 203.

The codation module 200 may also include a plurality of tonal carrier demodulators (e.g., a first tonal carrier demodulator 246 and a second tonal carrier demodulator 248). The plurality of tonal carrier demodulators may receive a plurality of down-converted tonal carriers (e.g., a first down-converted tonal carrier 252 and a second down-converted tonal carrier 254) from the receiver and down-converter 242). The plurality of down-converted tonal carriers may originate in a codation module 255 associated with the second GERAN transceiver 203. The plurality of tonal carrier demodulators may demodulate a second plurality of turbo-encoded data bursts 256 from the plurality of down-converted tonal carriers.

A channel de-interleaver 258 may be coupled to the plurality of tonal carrier demodulators. The channel de-interleaver 258 may assemble the second plurality of turbo-encoded data bursts 256 into a second turbo-encoded data block 262. A second rate-matching module 266 may be coupled to the channel de-interleaver 258. The second rate-matching module 266 may perform a bit de-puncturing operation, a repeated bit combining operation, or both on the second turbo-encoded data block 262.

The codation module 200 may also include a turbo decoder 270 coupled to the second rate-matching module 266. The turbo decoder 270 may perform a decoding operation on the second turbo-encoded data block 262. A data sink 272 may accept a resulting decoded data block 274 from the turbo decoder 270.

In another embodiment, a wireless system 280 may include one or more GERAN transceivers (e.g., the GERAN transceivers 202 and 203), each with a codation module 200, as previously described. The codation module 200 may be operatively coupled to an antenna 284 to facilitate communications in a GERAN. The antenna 284 may comprise a patch antenna, an omnidirectional antenna, a beam antenna, a slot antenna, a monopole antenna, or a dipole antenna, among other types.

Any of the components previously described can be implemented in a number of ways, including embodiments in software. Thus, the data blocks 106, 130, 207, 210, 262, 274; the data bursts 108, 110, 118, 123, 126, 132, 216, 256; the tonal carriers 114, 122, 217, 218, 252, 254; the timeslots 124, 137; the frames 125, 133, 134, 136, 138, 140, 142, 144; the codation modules 200, 255; the GERAN transceivers 202, 203; the data source 204; the turbo encoder 206; the rate-matching modules 211, 266; the channel interleaver 212; the tonal carrier modulators 230, 232; the up-converter and transmitters 240, 244; the receiver and down-converters 241, 242; the RF signal 243; the tonal carrier demodulators 246, 248; the channel de-interleaver 258; the turbo decoder 270; the data sink 272; the system 280; and the antenna 284 may all be characterized as "modules" herein.

The modules may include hardware circuitry, single or multi-processor circuits, memory circuits, software program modules and objects, firmware, and combinations thereof, as desired by the architect of the codation module 200 and the system 180 and as appropriate for particular implementations of various embodiments.

The apparatus and systems of various embodiments may be useful in applications other than interleaving an encoded data block across multiple GERAN tonal carriers. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

Figure 3:
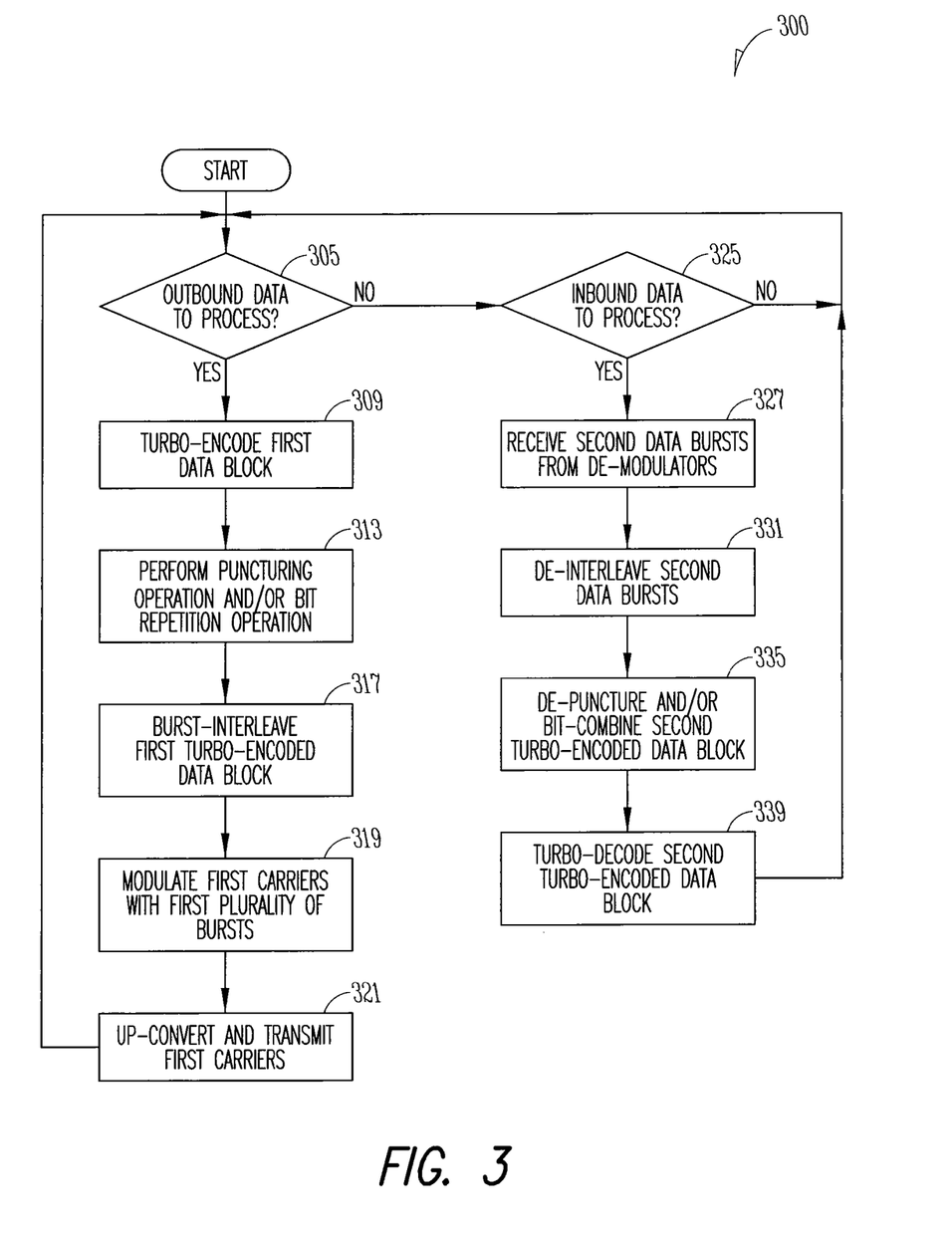
FIG. 3 is a flow diagram illustrating several methods according to various embodiments.

FIG. 3 is a flow diagram illustrating several methods according to various embodiments. In one example, a method 300 may transmit a first turbo-encoded data block in a first plurality of bursts across a first plurality of tonal carriers in a GERAN.

The method 300 may commence at block 305 with detecting a presence of outbound data to process. If outbound data is present, the method 300 may continue at block 309 with turbo-encoding a first unencoded data block to derive the first turbo-encoded data block. The method 300 may also include performing a puncturing operation on the first turbo-encoded data block to increase the coding rate, a bit repetition operation to increase a signal-to-noise ratio associated with a repeated bit, or both, at block 313.

The method 300 may further include burst-interleaving the first turbo-encoded data block to yield the first plurality of bursts, at block 317. The first plurality of bursts may be organized for transmission across the first plurality of tonal carriers, as previously described. For example, the first plurality of tonal carriers may comprise a first tonal carrier and a second tonal carrier. Using this two-carrier example, the first turbo-encoded data block may be divided into a first subset of bursts and a second subset of bursts. The first subset of bursts may be organized for transmission on the first tonal carrier and the second subset of bursts may be organized for transmission on the second tonal carrier.

In some embodiments, consecutive ones of the first subset of bursts transmitted on the first tonal carrier, the second subset of bursts transmitted on the second tonal carrier, or both may be transmitted on consecutive data frames. Alternatively, consecutive ones of the first subset of bursts transmitted on the first tonal carrier, the second subset of bursts transmitted on the second tonal carrier, or both may be transmitted on a single data frame.

In an example embodiment, the first plurality of bursts may comprise eight bursts. One burst may be inserted in a timeslot associated with each of four consecutive GERAN frames transmitted on the first tonal carrier and with each of four consecutive GERAN frames transmitted on the second tonal carrier.

The method 300 may also include modulating the first plurality of tonal carriers using the first plurality of bursts, at block 319. Modulation methods may include a Gaussian minimum-shift keying technique, an 8-state phase-shift keying technique, and/or a 16-state quadrature amplitude modulation technique, among others.

The method 300 may further include up-converting the modulated first plurality of tonal carriers and transmitting a resulting RF signal, at block 321. Some embodiments may perform a channel-hopping operation by up-converting the first plurality of tonal carriers to a plurality of RF carriers. Controls may return to block 305 as described above.

Referring to block 305, if no outbound data is present to process for transmission, the method 300 may inquire if inbound data is present and pending processing, at block 325. If no outbound data is present to process for transmission, controls may return to block 305 as described above. Otherwise, if inbound data is present and pending processing, the method 300 may include receiving a second plurality of data bursts associated with a second turbo-encoded data block from a plurality of tonal carrier demodulators, at block 327.

The method 300 may continue at block 331 with de-interleaving the second plurality of data bursts to yield the second turbo-encoded data block. A de-puncturing operation, a repeated bit combining operation, or both may be performed on the second turbo-encoded data block, at block 335. An iteration of the method 300 may terminate at block 339 with turbo-decoding the second turbo-encoded data block to yield a second unencoded data block.

It may be possible to execute the activities described herein in an order other than the order described. And, various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 4 below.

Figure 4:
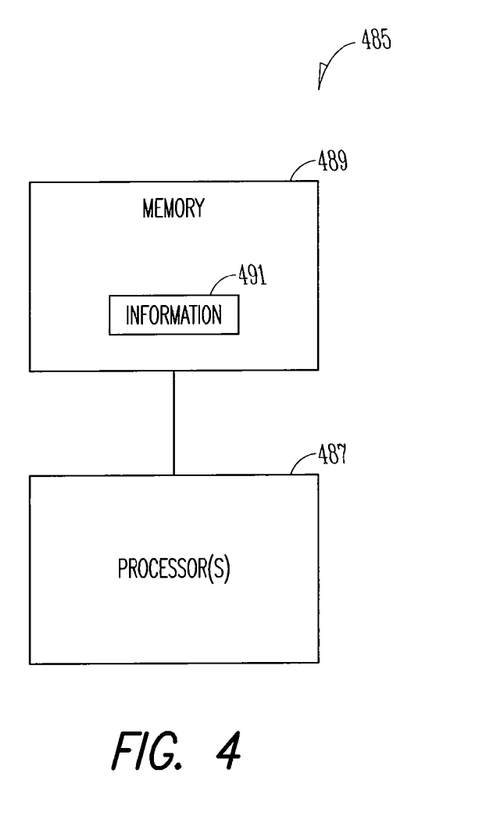
FIG. 4 is a block diagram of an article according to various embodiments.

FIG. 4 is a block diagram of an article 485 according to various embodiments of the invention. Examples of such embodiments may comprise a computer, a memory system, a magnetic or optical disk, some other storage device, or any type of electronic device or system. The article 485 may include one or more processor(s) 487 coupled to a machine-accessible medium such as a memory 489 (e.g., a memory including electrical, optical, or electromagnetic elements). The medium may contain associated information 491 (e.g., computer program instructions, data, or both) which, when accessed, results in a machine (e.g., the processor(s) 487) performing the activities previously described.

Implementing the apparatus, systems, and methods disclosed herein may enhance performance through the use of cooperative channel encoding ("interleaving") of a turbo-encoded data block across multiple GERAN tonal carriers. Multi-carrier interleaving may increase throughput by increasing carrier diversity, particularly for higher over-terrain vehicle speeds. Greater throughput may be achieved than if two independent GERAN channels were transmitted, one on each tonal carrier.

Although the inventive concept may include embodiments described in the exemplary context of an ETSI GERAN standard implementation or an IEEE standard 802.xx implementation (e.g., 802.11, 802.11a, 802.11b, 802.11e, 802.11g, 802.16, etc.), the claims are not so limited. Additional information regarding the IEEE 802.11 standard may be found in "ANSI/IEEE Std. 802.11, Information technology—Telecommunications and information exchange between systems—Local and metropolitan area networks—Specific requirements—Part 11: Wireless LAN Medium Access Control (MAC) and Physical Layer (PHY) Specifications" (published 1999; reaffirmed June 2003). Additional information regarding the IEEE 802.11a protocol standard may be found in IEEE Std 802.11a, Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications—High-speed Physical Layer in the 5 GHz Band (published 1999; reaffirmed Jun. 12, 2003). Additional information regarding the IEEE 802.11b protocol standard may be found in IEEE Std 802.11b, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band (approved Sep. 16, 1999; reaffirmed Jun. 12, 2003). Additional information regarding the IEEE 802.11E standard may be found in "IEEE 802.11e Standard for Information technology—Telecommunications and information exchange between systems—Local and metropolitan area networks—Specific requirements Part 11: Wireless LAN Medium Access Control (MAC) and Physical Layer (PHY) specifications: Amendment 8: Medium Access Control (MAC) Quality of Service Enhancements (published 2005). Additional information regarding the IEEE 802.11g protocol standard may be found in IEEE Std 802.11 g™, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band (approved Jun. 12, 2003).

Embodiments of the present invention may be implemented as part of any wired or wireless system. Examples may also include embodiments comprising multi-carrier wireless communication channels (e.g., orthogonal frequency division multiplexing (OFDM), discrete multitone (DMT), etc.) such as may be used within a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A codation module, including:
a turbo encoder to produce a first turbo-encoded data block in a global system for mobile communications (GSM) enhanced data rates for GSM evolution (EDGE) radio access network (GERAN) transceiver; and
a channel interleaver operatively coupled to the turbo encoder to split the first turbo-encoded data block into a first plurality of turbo-encoded data bursts and to interleave the first plurality of turbo-encoded data bursts for individual transmission on a plurality of tonal carriers, wherein the tonal carriers correspond to independent GERAN frequency channels.

2. The codation module of claim 1, further including:
a data source coupled to the turbo encoder to supply a data block to the turbo encoder; and
a first rate-matching module coupled to the turbo encoder to perform at least one of a bit puncturing operation on the first turbo-encoded data block to increase the coding rate or a bit repetition operation on the first turbo-encoded data block to increase a signal-to-noise ratio associated with a repeated bit,
wherein the channel interleaver is adapted to interleave the first plurality of turbo-encoded data bursts for transmission within corresponding time-slots of sequential frames of the plurality of tonal carriers.

3. The codation module of claim 1, further including:
a plurality of tonal carrier modulators coupled to the channel interleaver to modulate a plurality of tonal carriers with the first plurality of turbo-encoded data bursts.

4. The codation module of claim 1, further including:
a plurality of tonal carrier demodulators to receive a plurality of down-converted tonal carriers and to demodulate a second plurality of turbo-encoded data bursts from the plurality of down-converted tonal carriers; and
a channel de-interleaver coupled to the plurality of tonal carrier demodulators to assemble the second plurality of turbo-encoded data bursts into a second turbo-encoded data block.

5. The codation module of claim 4 further including:
a second rate-matching module coupled to the channel de-interleaver to perform at least one of a bit de-puncturing operation or a repeated bit combining operation on the second turbo-encoded data block.

6. The codation module of claim 4, further including:
a turbo decoder coupled to the second rate-matching module to perform a decoding operation on the second turbo-encoded data block; and
a data sink to accept a decoded data block from the turbo decoder.

7. The codation module of claim 1, wherein a block length associated with the first turbo-encoded data block comprises a multiple not less than 1.0 of an enhanced general packet radio service block length defined according to a 3rd Generation Partnership Project Technical Specification TS 43.064 V6.5.0 (2004-11).

8. A system, including:
an omnidirectional antenna to facilitate communications in a global system for mobile communications (GSM) enhanced data rates for GSM evolution (EDGE) radio access network (GERAN); and
a codation module operatively coupled to the omnidirectional antenna, the codation module comprising:
a turbo encoder to produce a turbo-encoded data block in a GERAN transceiver; and
a channel interleaver operatively coupled to the turbo encoder to split the turbo-encoded data block into a plurality of turbo-encoded data bursts and to interleave the plurality of turbo-encoded data bursts for individual transmission on a plurality of tonal carriers, wherein the tonal carriers correspond to independent GERAN frequency channels.

9. The system of claim 8, wherein the channel interleaver is adapted to interleave the plurality of turbo-encoded data bursts for transmission within corresponding time-slots of sequential frames of the plurality of tonal carriers.

10. The system of claim 8, wherein a block length associated with the turbo-encoded data block comprises a multiple of not less than 1.0 of an enhanced general packet radio service block length defined according to a 3rd Generation Partnership Project Technical Specification TS 43.064 V6.5.0 (2004-11).

11. A method, including:
splitting a first turbo-encoded data block into a first plurality of turbo-encoded data bursts;
interleaving the first plurality of turbo-encoded data bursts for individual transmission on a plurality of tonal carriers; and
transmitting the first plurality of bursts on the first plurality of tonal carriers in a global system for mobile communications (GSM) enhanced data rates for GSM evolution (EDGE) radio access network (GERAN),
wherein the first plurality of tonal carriers correspond to independent GERAN frequency channels.

12. The method of claim 11, wherein the first plurality of tonal carriers comprises a first tonal carrier and a second tonal carrier,
wherein the channel interleaver is adapted to interleave the first plurality of turbo-encoded data bursts for transmission within corresponding time-slots of sequential frames of the plurality of tonal carriers.

13. The method of claim 12, wherein the first plurality of bursts comprise a first subset of bursts transmitted on the first tonal carrier and a second subset of bursts transmitted on the second tonal carrier.

14. The method of claim 13, wherein consecutive ones of at least one of the first subset of bursts transmitted on the first tonal carrier or the second subset of bursts transmitted on the second tonal carrier are transmitted on consecutive data frames.

15. The method of claim 13, wherein consecutive ones of at least one of the first subset of bursts transmitted on the first tonal carrier or the second subset of bursts transmitted on the second tonal carrier are transmitted on a single data frame.

16. The method of claim 11, wherein the first plurality of bursts comprises eight bursts, one burst inserted in a timeslot associated with each of four consecutive GERAN frames transmitted on a first tonal carrier of the plurality of tonal carriers and one burst inserted in a timeslot associated with each of four consecutive GERAN frames transmitted on a second tonal carrier of the plurality of tonal carriers.

17. The method of claim 11, further including:
turbo-encoding a first unencoded data block to derive the first turbo-encoded data block.

18. The method of claim 11, further including:
performing at least one of a puncturing operation on the first turbo-encoded data block to increase the coding rate or a bit repetition operation on the first turbo-encoded data block to increase a signal-to-noise ratio associated with a repeated bit.

19. The method of claim 11, further including:
burst-interleaving the first turbo-encoded data block to yield the first plurality of bursts.

20. The method of claim 11, further including:
modulating the first plurality of tonal carriers using the first plurality of bursts.

21. The method of claim 20, wherein the first plurality of tonal carriers is modulated using at least one of a Gaussian minimum-shift keying technique, an 8-state phase-shift keying technique, or a 16-state quadrature amplitude modulation technique.

22. The method of claim 11, further including:
performing a channel-hopping operation by up-converting the first plurality of tonal carriers to a plurality of radio frequency (RE) carriers.

23. The method of claim 11, further including:
receiving a second plurality of bursts associated with a second turbo-encoded data block from a plurality of tonal carrier demodulators in a GERAN.

24. The method of claim 23, further including:
de-interleaving the second plurality of data bursts to yield the second turbo-encoded data block.

25. The method of claim 23, further including:
performing at least one of a de-puncturing operation or a repeated bit combining operation on the second turbo-encoded data block.

26. The method of claim 23, further including:
turbo-decoding the second turbo-encoded data block to yield a second unencoded data block.

27. An article including a machine-accessible medium having associated information, wherein the information, when accessed, results in a machine performing:
receiving a plurality of data bursts associated with a turbo-encoded data block from a plurality of tonal carrier demodulators in a global system for mobile communications (GSM) enhanced data rates for GSM evolution (EDGE) radio access network (GERAN),
wherein prior to transmission, the data bursts were split from the first turbo-encoded data block into a plurality of turbo-encoded data bursts and interleaved for individual transmission on a plurality of tonal carriers corresponding to the plurality of tonal carrier demodulators, and
wherein the plurality of tonal carriers correspond to independent GERAN frequency channels.

28. The article of claim 27, wherein the information, when accessed, results in a machine performing:
de-interleaving the plurality of data bursts to yield the turbo-encoded data block.

29. The article of claim 27, wherein the information, when accessed, results in a machine performing:
performing at least one of a de-puncturing operation or a repeated bit combining operation on the turbo-encoded data block.

30. The article of claim 27, wherein the information, when accessed, results in a machine performing:
turbo-decoding the turbo-encoded data block to yield an unencoded data block.

* * * * *

UNITED STATES PATENT AND TRADEMARK OFFICE
CERTIFICATE OF CORRECTION

| | | |
|---|---|---|
| PATENT NO. | : 7,616,697 B2 | Page 1 of 1 |
| APPLICATION NO. | : 11/400757 | |
| DATED | : November 10, 2009 | |
| INVENTOR(S) | : Paul Spencer | |

It is certified that error appears in the above-identified patent and that said Letters Patent is hereby corrected as shown below:

In column 10, line 15, in Claim 22, delete "(RE)" and insert -- (RF) --, therefor.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,616,697 B2  Page 1 of 1
APPLICATION NO. : 11/400757
DATED : November 10, 2009
INVENTOR(S) : Paul Spencer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 748 days.

Signed and Sealed this

Nineteenth Day of October, 2010

David J. Kappos
*Director of the United States Patent and Trademark Office*